US 6,690,892 B1

(12) United States Patent
Effenberger

(10) Patent No.: US 6,690,892 B1
(45) Date of Patent: Feb. 10, 2004

(54) METHOD AND APPARATUS FOR CONTROLLING DELAY IN A SHARED COMMUNICATIONS NETWORK

(75) Inventor: Frank J. Effenberger, Eatontown, NJ (US)

(73) Assignee: Quantum Bridge, Communications, Inc., Andover, MA (US)

(*) Notice: Subject to any disclaimer, the term of this patent is extended or adjusted under 35 U.S.C. 154(b) by 521 days.

(21) Appl. No.: 09/716,817

(22) Filed: Nov. 20, 2000

(51) Int. Cl.[7] .............................................. H04B 10/00
(52) U.S. Cl. ........................ 398/168; 398/53; 398/98; 398/99; 398/102; 398/161; 370/230; 370/252; 370/253; 370/466
(58) Field of Search ............................. 398/53, 98, 99, 398/102, 161, 168; 370/252, 253, 230, 466

(56) References Cited

U.S. PATENT DOCUMENTS

| 5,327,277 A | | 7/1994 | Van Der Plas et al. ...... 359/140 |
| 5,808,766 A | * | 9/1998 | Van de Voorde et al. ... 398/102 |
| 5,930,018 A | * | 7/1999 | Effenberger ................. 398/161 |
| 6,498,667 B1 | * | 12/2002 | Masucci et al. .............. 398/98 |

OTHER PUBLICATIONS

ITU–T Recommendation G.983.1 "Broadband Optical Access System Based on Passive Optical Networks (PON)", Oct. 1998.

* cited by examiner

Primary Examiner—Leslie Pascal
Assistant Examiner—Dzung Tran
(74) Attorney, Agent, or Firm—Hamilton, Brook, Smith & Reynolds, P.C.

(57) ABSTRACT

A communications network includes optical network terminations (ONTs) and an optical line termination (OLT) connected to a passive optical network (PON). The OLT measures round trip transmission delay expressed in time slot duration for each of the ONTs, and orders the ONTs in ascending order of respective delay modulo time slot duration. A desired reception time at the OLT is scheduled for each of the OLTs according to the ascending order and each ONT is commanded to transmit at a command time that leads the respective desired reception time by a respective delay integral time slot duration. The scheduling includes leaving a reception interval spare after the last ONT in ascending order. The ascending delay modulo slot protocol becomes more efficient as the number of time slots per frame increases. If the number of time slots per frame is N, then the efficiency of the protocol is (N–1)/N. Unassigned time required per transmission frame is thereby reduced.

10 Claims, 4 Drawing Sheets

METHOD AND APPARATUS FOR CONTROLLING DELAY IN A SHARED COMMUNICATIONS NETWORK

BACKGROUND OF THE INVENTION

A well-known optical fiber communications network includes a central access switch or optical line termination (OLT), several optical network terminations (ONTs) and one or more optical distribution networks also referred to as passive optical networks (PONs). Such networks typically use time division multiplexing of time slots from the OLT downstream to the ONTs and time division multiple access of time slots from the ONTs upstream to the OLT over the PON. The PON offers one or more optical paths between one OLT and one or more ONTs. The characteristics of the PON are such that each ONT may be at a different distance from the OLT. This distance implies that each ONT's transmissions are delayed by a fixed but arbitrary amount when compared to the OLT clock. These delays need to be compensated for in order to keep transmissions of multiple ONTs from possibly overlapping and producing data loss.

In systems compatible with ITU Recommendation G.983.1 "Broadband Optical Access Systems Based on Passive Optical Networks" (October 1998) (incorporated herein by reference), the OLT controls upstream transmissions from ONTs by sending grants. A grant is a permission to transmit upstream data.

One approach to controlling transmissions on a PON to avoid collisions is referred to as range compensation. Range compensation protocols (e.g., U.S. Pat. No. 5,322,277) operate by first measuring the transmission delay of each ONT at the OLT. The measured transmission delays are then communicated by the OLT to the respective ONTs. Each ONT further delays its transmissions by a fixed amount such that all the ONTs share a common delay. With the ONTs synchronized in this manner, their transmissions can interleave without the risk of collision. In addition, the entire upstream frame is used to carry data and the ONTs can transmit in arbitrary order.

Another approach is called the ascending delay protocol (ADP) which is disclosed in U.S. Pat. No. 5,930,018. The ADP operates by first measuring the transmission delay of each ONT at the OLT. The ONTs are granted bandwidth in order of ascending delay, and the OLT leaves the ending portion of a transmission frame of time slots unassigned. This unassigned portion has a duration equal to the maximum differential delay between the closest and farthest ONTs in distance from the OLT. In the ADP, the ONTs transmit without delay, and because of their ascending ordering, no collisions result.

SUMMARY OF THE INVENTION

The range compensation protocol requires communication of ranging delay information to the ONTs. A cost of the ascending delay protocol is the unassigned time required at the end of the frame. For typical systems which can have 20 km logical differential delay, this implies on the order of 200 microseconds of unassigned time. Depending on the frame duration, this unassigned time can become a significant waste of capacity.

There is a need for an approach to controlling transmissions on a PON that eliminates having to communicate ranging delay information to the ONTs while also reducing unassigned time required per transmission frame.

Accordingly, the present invention operates in a communications network which includes an OLT and plural ONTs connected to a common transmission medium (e.g., a passive optical network) and uses a transmission frame structure having time slots for communication. The approach is referred to herein as the ascending delay modulo slot protocol. A method includes measuring round trip transmission delay expressed in time slot duration for each of the ONTs on the transmission medium and ordering the ONTs in ascending order of respective delay modulo time slot duration. A desired reception time at the OLT is scheduled for each of the OLTs according to the ascending order and each ONT is commanded to transmit at a command time that leads the respective desired reception time by a respective delay integral time slot duration.

The scheduling includes leaving a reception interval spare after the last ONT in ascending order. The reception interval comprises one time slot. The present approach, an improvement over the known ascending delay protocol, becomes more efficient as the number of time slots per frame increases. If the number of time slots per frame is N, then the efficiency of the protocol is (N−1)/N.

A communications network according to the present invention includes plural ONTs and an OLT connected to a PON. The OLT includes means for measuring round trip transmission delay expressed in time slot duration for each of the ONTs, means for ordering the ONTs in ascending order of respective delay modulo time slot duration, means for scheduling a desired reception time at the OLT for each of the OLTs according to the ascending order and means for commanding each ONT to transmit at a command time that leads the respective desired reception time by a respective delay integral time slot duration.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
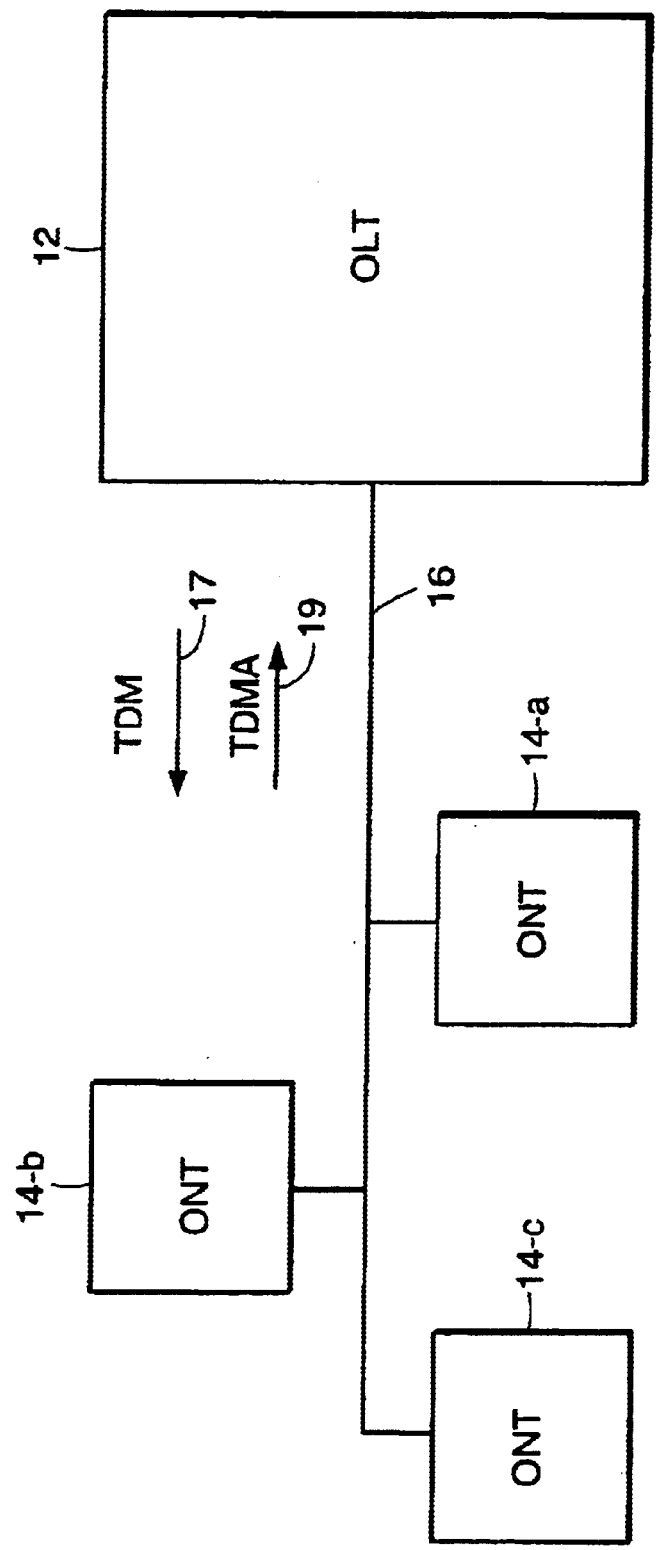
FIG. 1 is a block diagram of an optical access communication system.

FIG. 1 shows a block diagram of an optical access system which includes an optical line termination (OLT) 12, optical network terminations (ONTs) 14-a, 14-b, 14c and a passive optical network (PON) 16. The system provides a downstream data signal 17 over the PON 16 from the OLT 12 to the ONTs 14-a, 14-b, 14-c using time division multiplexing. An upstream data signal 19 from the ONTs 14 to the OLT 12 over the PON 16 is provided in burst transmissions using time division multiple access.

As noted previously, the characteristics of the PON are such that each ONT may be at a different distance from the OLT. For example, in the system of FIG. 1, the ONTs are illustrated as being connected to the PON at different distances from the OLT 12 such that ONT 14-*a* is closest and ONT 14-*c* is furthest, with ONT 14-*b* in between. These distances imply that the transmissions from each ONT are delayed by a fixed but arbitrary amount when compared to the OLT clock. In order to keep transmissions of multiple ONTs from possibly overlapping and producing data loss, these delays are compensated for by the present approach now described.

Figure 2:
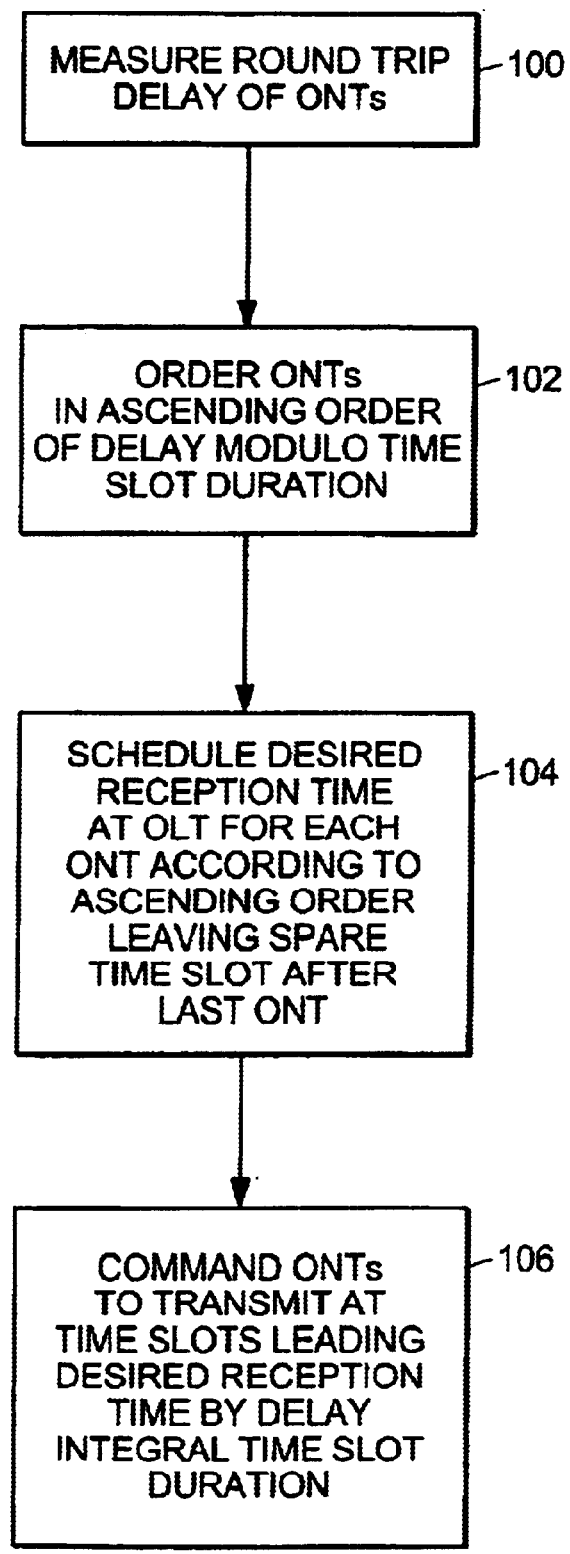
FIG. 2 is a flow diagram showing a process for controlling transmission on the access system of FIG. 1 in accordance with the present invention.

According to the present approach, referred to herein as the ascending delay modulo slot protocol (ADMSP), an embodiment of the OLT 12 controls ONT transmissions on the PON using the process illustrated in FIG. 2. At block 100, the OLT measures the round trip transmission delay of each ONT connected to the PON. At block 102, the OLT orders the ONTs in ascending order of their respective delay modulo the time slot duration. The OLT schedules a desired reception time at the OLT for each of the ONTs according to the ascending order at block 104. Each ONT is commanded at block 106 to transmit at a command time that leads the respective desired reception time by a respective delay integral the time slot duration. In the scheduling, the OLT leaves one time slot of reception spare when moving from the last ONT back to the first ONT.

A basic principle in operation with the ADMSP is the same as in the ascending delay protocol: overlapping transmissions cause collisions, but gaps between transmissions are harmless. By ordering the ONT transmissions in ascending delay modulo time slot duration, as described herein for the ADMSP, it is possible to schedule the ONTs such that there are only gaps, and not overlaps. In the known ascending delay protocol, a frame of contiguous grants is sent to command or request transmissions from the ONTs. In contrast, with the ADMSP of the present approach, the ONTs are given grants or commands that lead a desired time of reception at the OLT.

Figure 3:
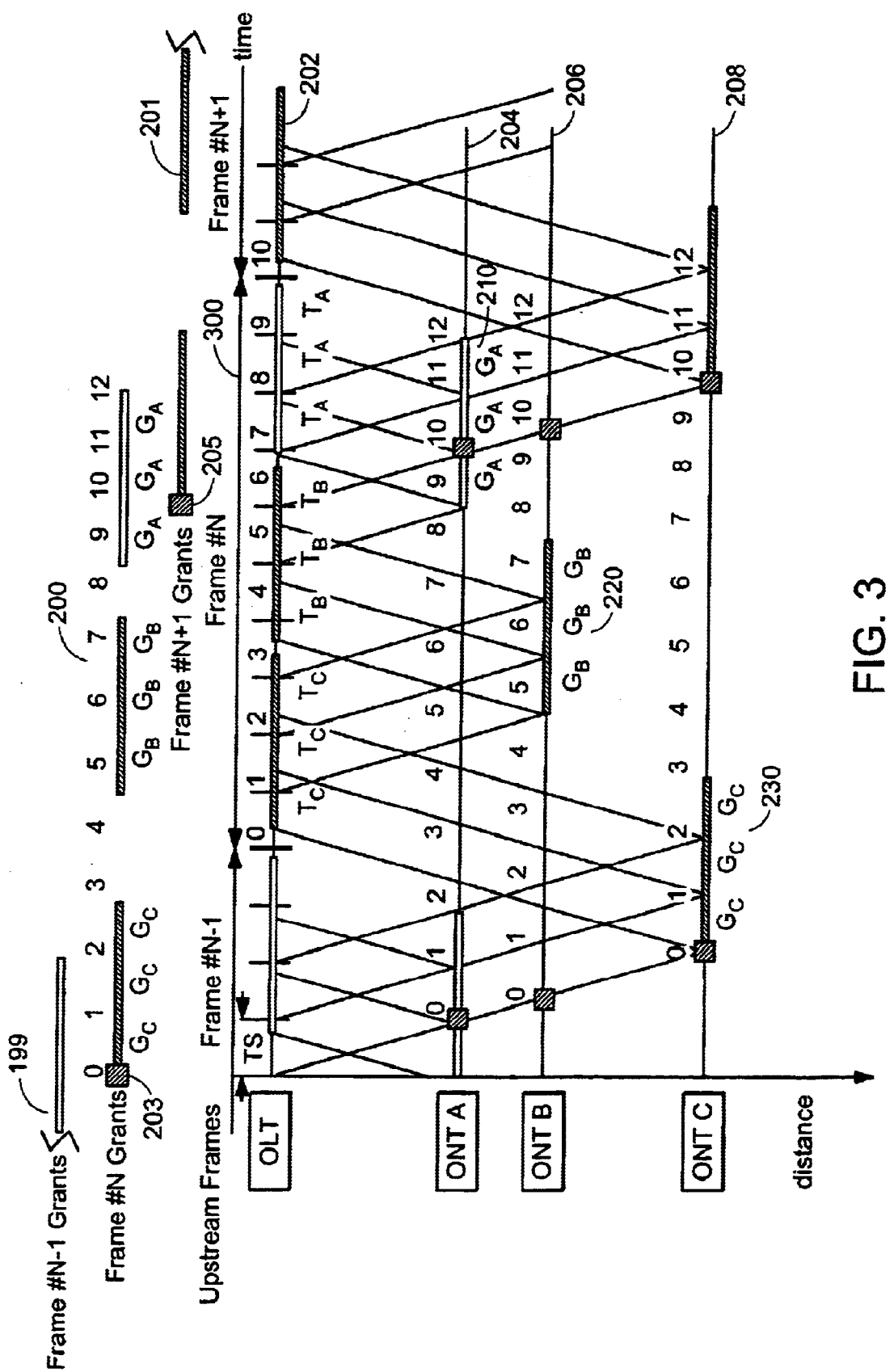
FIG. 3 is a timing diagram illustrating transmissions in accordance with the process of FIG. 2.

A transmission timing diagram is shown in FIG. 3 for the ADMSP of the present approach. The vertical axis indicates distance from the OLT and the horizontal axis indicates time. An upstream frame 300 of transmissions is shown having 10 time slots. Frames N−1, N, N+1 (199, 200, 201) of grants are shown above the OLT time axis 202, while the received frame of transmissions 300 is shown on the axis, both with respect to the OLT. Frame 200 includes grants $G_A$, $G_B$, $G_C$ and timing signal 203 which indicates the location along the time axis where the frame starts. Frames 199, 201 are only partially shown with timing signal 205 associated with frame 201. The propagation delayed grants 210, 220, 230 at each ONT are shown on the lower scales 204, 206, 208, respectively. In a preferred embodiment, all of the grant information is sent in one or more grant messages at the beginning of a grant frame, rather than in separate transmissions spread across the grant frame. In that embodiment, the grant information includes start and stop information described below. Thus, the spaced apart grants $G_A$, $G_B$, $G_C$ illustrated in frame 200 and along axes 204, 206, 208 correspond to a logical view of the grant information.

In the example of FIG. 3, the ONTs labeled ONT A, ONT B, ONT C have round trip transmission delays of 1.9, 2.6 and 4.3 time slots, respectively, where time slots are indicated having duration TS. The round trip transmission delay is basically twice the time necessary to transmit information to an ONT. According to the ADMSP process described above in FIG. 2, the grants or commands given to ONT C (indicated by $G_C$) lead the desired position of reception at the OLT by an amount equal to the delay integral the slot time, i.e., integral 4.3, which equals 4 time slots. Likewise, the grants ($G_B$ and $G_A$ respectively) given to ONT B and ONT A lead their respective desired reception positions at the OLT by 2 (integral 2.6) and 1 (integral 1.9) time slots, respectively.

Figures 4, 5:
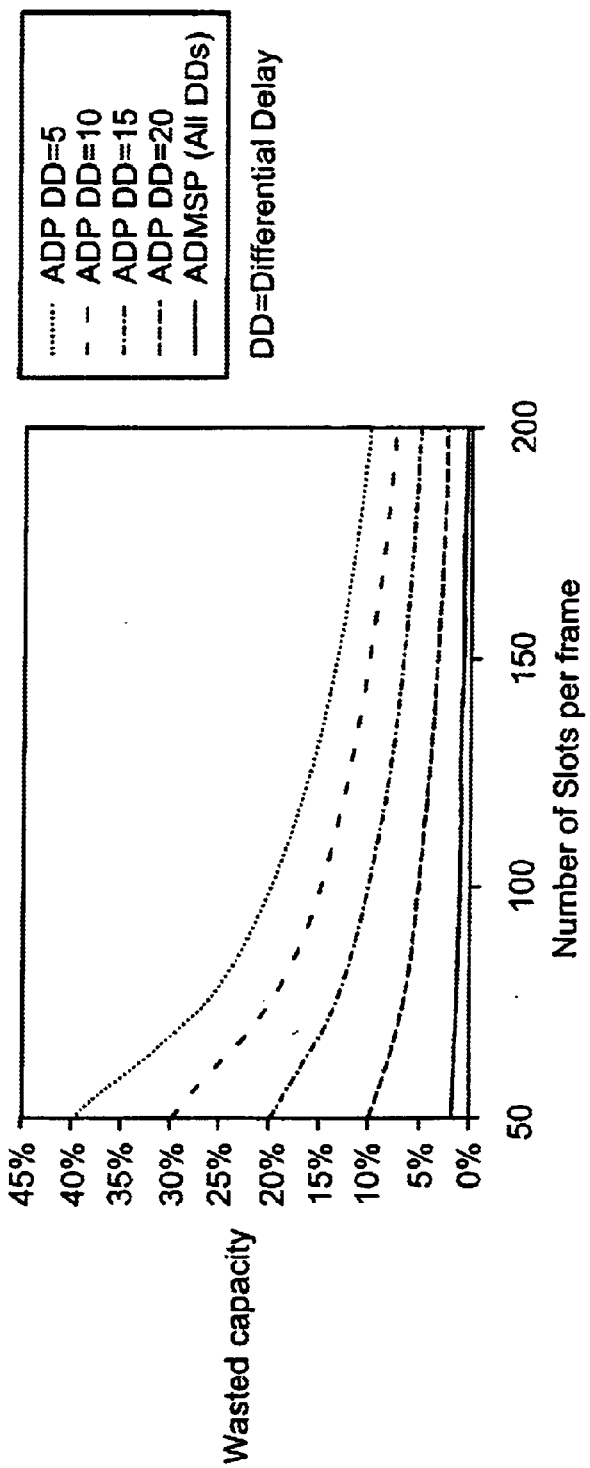
FIG. 4 is a table which includes a list of start and stop times for grants and slots corresponding to the timing diagram of FIG. 3.
FIG. 5 is a chart illustrating the efficiency of the process of FIG. 2 in relation to the ascending delay protocol.

FIG. 4 shows a listing of the start and stop times for all of the grants sent and time slots received for the Nth frame 200. The grants are sent as indicated in the left side columns marked "grants sent w.r.t. OLT frame". For example, the grant information associated with ONT A indicates that ONT A is to start transmission at time slot 9 and stop transmission after time slot 12 with respect to its local clock. The grant information and the timing signal 203 indicating where the frame starts are transmitted downstream on the PON 16 (FIG. 1) and are received by each ONT.

Each ONT then transmits at the granted times, according to its own local clock (the local time is indicated for each ONT on its own axis.) These transmissions travel back over the PON, and are received with respect to the OLT frame at the times indicated in the middle columns marked "slots received w.r.t. OLT frame". Note that the reception times are simply the granted times plus the delays for each ONT. For example, ONT A has an associated delay of 1.9 time slots. Since the upstream frame is delayed in time from the downstream grant frame by a fixed common delay, (e.g., 4 time slots) this can be subtracted to give the timing of the right side columns marked "slots received w.r.t. the upstream frame." This right side column shows that nine time slots worth of transmissions (i.e., corresponding to three time slots granted to each of the three ONTs) are received without collision at the OLT, and within a frame of 10 time slots of total time. The small gaps between the transmissions are harmless.

The ADMSP of the present approach eliminates the need for a range compensation circuit at the ONT and obviates the need to communicate the ranging delay to the ONT, similar to the ADP. However, the ADMSP is an improvement over ADP in that the unassigned time required per frame is reduced from the maximum differential delay to just a single time slot. For example, in the timing diagram of FIG. 3, the transmissions in frame 300 use 9 of 10 time slots. Since the number of time slots per frame is an arbitrary design parameter, it can be made such that the wasted time is small for the present ADMSP.

The present protocol becomes more efficient as the number of time slots per frame increases. If the number of time slots per frame is N, then the efficiency of the protocol is (N−1)/N. Since typical systems have ~100 slots per frame, the efficiency using ADMSP is near 99%. This efficiency is compared to ADP in FIG. 5 which shows a plot of wasted capacity (i.e., 1 - efficiency) versus time slots per frame. The efficiency of ADP is given by (N−DD)/N, where DD is the maximum differential delay in slots. Since typical systems exhibit DDs of 10~20, the inefficiency of ADP can be 10–20% for systems with 100 slots per frame. This effect pushes an ADP design towards larger frame sizes, but this has unwanted consequences in transmission latency and jitter. Note that the ADMSP has very low wasted capacity (<2%) for all reasonable values of design parameters, while the ADP can waste 10–20% of capacity in many situations. Hence, the ADMSP is superior and offers more design freedom.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a communications network having an optical line termination (OLT) and plural optical network terminations (ONTs) connected to a common transmission medium and communicating using a frame structure having time slots, a method comprising:

measuring round trip transmission delay expressed in time slot duration for each of the ONTs on the transmission medium;

ordering the ONTs in ascending order of respective delay modulo time slot duration;

scheduling a desired reception time at the OLT for each of the OLTs according to the ascending order; and commanding each ONT to transmit at a command time that leads the respective desired reception time by a respective delay integral time slot duration.

2. The method of claim 1 wherein scheduling includes leaving a reception interval spare after the last ONT in ascending order.

3. The method of claim 2 wherein the reception interval comprises one time slot.

4. The method of claim 1 wherein the common transmission medium is a passive optical network.

5. In a communications network having an optical line termination (OLT) and plural optical network terminations (ONTS) connected to a passive optical network (PON) and communicating using a frame structure having time slots, a method comprising:

at the OLT measuring round trip transmission delay expressed in time slot duration for each of the ONTs on the PON;

scheduling a desired reception time at the OLT for each of the OLTs according to ascending order of respective delay modulo time slot duration;

commanding each ONT to transmit data at a command time that leads the respective desired reception time at the OLT by a respective delay integral time slot duration; and receiving data at the OLT from the ONTs in the ascending order at the respective desired reception time offset by the respective delay modulo time slot duration.

6. The method of claim 5 wherein scheduling includes leaving a reception interval spare after the last ONT in ascending order.

7. The method of claim 6 wherein the reception interval comprises one time slot.

8. A communications network comprising:

a passive optical network (PON);

plural optical network terminations (ONTs) connected to the PON; and an optical line termination (OLT) connected to the PON, the OLT comprising means for measuring round trip transmission delay expressed in time slot duration for each of the ONTs, means for ordering the ONTs in ascending order of respective delay modulo time slot duration, means for scheduling a desired reception time at the OLT for each of the OLTs according to the ascending order and means for commanding each ONT to transmit at a command time that leads the respective desired reception time by a respective delay integral time slot duration.

9. The communications network of claim 8 wherein the means for scheduling includes means for leaving a reception interval spare after the last ONT in ascending order.

10. The communications network of claim 9 wherein the reception interval comprises one time slot.

* * * * *